(12) United States Patent
Song

(10) Patent No.: US 8,277,870 B2
(45) Date of Patent: Oct. 2, 2012

(54) METHOD OF CONTROLLING CORROSION AT AN INTERFACE FORMED BETWEEN METAL COMPONENTS

(75) Inventor: Guangling Song, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 438 days.

(21) Appl. No.: 12/323,443

(22) Filed: Nov. 25, 2008

(65) Prior Publication Data

US 2010/0129531 A1    May 27, 2010

(51) Int. Cl.
*B05D 5/12* (2006.01)
*C04B 37/00* (2006.01)
*C09J 7/02* (2006.01)

(52) U.S. Cl. ......... 427/58; 427/197; 427/256; 156/276; 156/325; 156/329; 156/330

(58) Field of Classification Search ............ 427/58, 427/197, 256; 156/276, 325, 329, 330
See application file for complete search history.

(56) References Cited

U.S. PATENT DOCUMENTS

| | | | |
|---|---|---|---|
| 4,325,994 A | 4/1982 | Kitashima et al. | |
| 4,385,096 A | 5/1983 | Wetzel | |
| 4,433,093 A * | 2/1984 | Shida et al. | 524/433 |
| 4,496,444 A | 1/1985 | Bagnulo | |
| 4,973,360 A * | 11/1990 | Satas | 106/33 |
| 5,747,111 A | 5/1998 | Fukui et al. | |
| 6,180,177 B1 | 1/2001 | Nagashima et al. | |
| 6,461,683 B1 * | 10/2002 | Modi | 427/410 |
| 6,770,812 B2 * | 8/2004 | Kimura et al. | 174/521 |
| 7,314,902 B2 | 1/2008 | Ton-That et al. | |

FOREIGN PATENT DOCUMENTS

| | | | |
|---|---|---|---|
| JP | 57076055 A | * | 5/1982 |
| JP | 59140275 | * | 8/1984 |

* cited by examiner

*Primary Examiner* — Brian K Talbot
(74) *Attorney, Agent, or Firm* — Dierker & Associates, P.C.

(57) ABSTRACT

A method of controlling corrosion at an interface formed between at least two metal components includes applying a blend of magnesium particles and one of an adhesive or a sealant to the interface. The magnesium particles have a diameter sufficient to span a distance between the metal components. The method further includes exposing the metal components to a substantially corrosive environment, where the corrosive environment at least partially dissolves the magnesium particles. At least partial dissolution of the magnesium particles i) cathodically protects the metal components at the interface, ii) alkalizes the corrosive environment, and iii) generates hydrogen bubbles that substantially block a crevice formed at the interface.

16 Claims, 2 Drawing Sheets

METHOD OF CONTROLLING CORROSION AT AN INTERFACE FORMED BETWEEN METAL COMPONENTS

TECHNICAL FIELD

The present disclosure relates generally to methods of controlling crevice corrosion and, more particularly, to a method of controlling corrosion at an interface formed between at least two metal components.

BACKGROUND

Metals are often used in the fabrication of many automotive body and structural components. Such components are sometimes joined or bonded together via adhesive bonding, where an adhesive is disposed in an interface formed between the joined components. In some instances, adhesive bonding is used in combination with a mechanical joining process (such as clinching, fastening (via a bolt, flange, etc.), riveting, or the like) and/or a metallurgical joining process (such as spot welding or other similar technique). The components may also be joined together using at least one of the above-mentioned processes, and the interface formed therebetween may be sealed by disposing a sealant in the interface.

SUMMARY

A method of controlling corrosion at an interface formed between at least two metal components is disclosed herein. The method includes applying a blend of magnesium particles and one of an adhesive or a sealant to the interface, the magnesium particles having a diameter sufficient to span a distance between the metal components at the interface. The method further includes exposing the metal components to a substantially corrosive environment which at least partially dissolves the magnesium particles at the interface. The at least partially dissolved magnesium particles i) cathodically protect the metal components at the interface, ii) alkalize the substantially corrosive environment, and iii) generate hydrogen bubbles that substantially block a crevice formed at the interface.

BRIEF DESCRIPTION OF THE DRAWINGS

Features and advantages the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiment(s) of the method disclosed herein advantageously control corrosion at an interface formed between metal components of a part or device (also referred to herein as crevice corrosion). It has been found that defects in adhesives or sealants and/or deformation of one or more of the components at the interface may occur as a result of the mechanical and/or metallurgical process(es) often employed to join two components together. For example, delamination of the adhesive or sealant from the surfaces of the components and/or dissolution of at least some of the adhesive or sealant may occur. Either of these deleterious processes tends to form crevices at the interface. Crevices may otherwise form simply via a natural degradation of the adhesive or sealant throughout the useful life of the joined components. Due at least in part to the geometric characteristics of the crevices at the interface, when the joined components are exposed to relatively corrosive environments, corrosive species may get trapped in the crevices and may, in some instances, initiate corrosion of the metal exposed by the crevices at the interface.

The present inventors have found that the methods disclosed herein advantageously control crevice corrosion. Such control is accomplished by mixing magnesium particles and one of an adhesive or a sealant to form a blend, and applying the blend to the interface between the components. Without being bound by any theory, it is believed that when the joined components are exposed to a corrosive environment, the magnesium particles at the interface will at least partially dissolve. Such partial dissolution is believed to substantially inhibit (and in some instances prevent) corrosion of the metal material of the joined components at the crevices. Corrosion inhibition or prevention of the metal material at the interface advantageously prolongs the useful life of the joined components, as well as substantially reduces the time and/or work involved for maintaining the joined components.

As used herein, the term "corrosive environment" refers to any environment that will cause or at least commence corrosion of a metal material when exposed thereto. Non-limiting examples of corrosive environments include environments with a relative humidity higher than 75%, environments containing water, environments containing salt, environments containing acids or acidic solutions, environments containing aqueous solutions and oxygen, and/or the like, and/or combinations thereof.

Figure 1A:
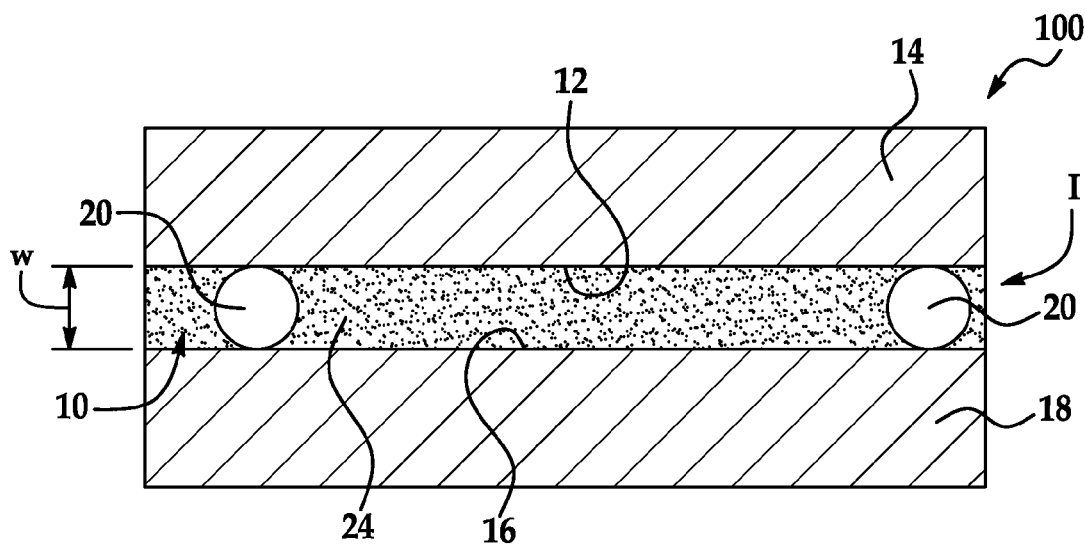
FIGS. 1A through 1C are schematic cross-sectional views which together depict an example of the method of controlling crevice corrosion at an interface formed between at least two metal components.
Figure 1B:
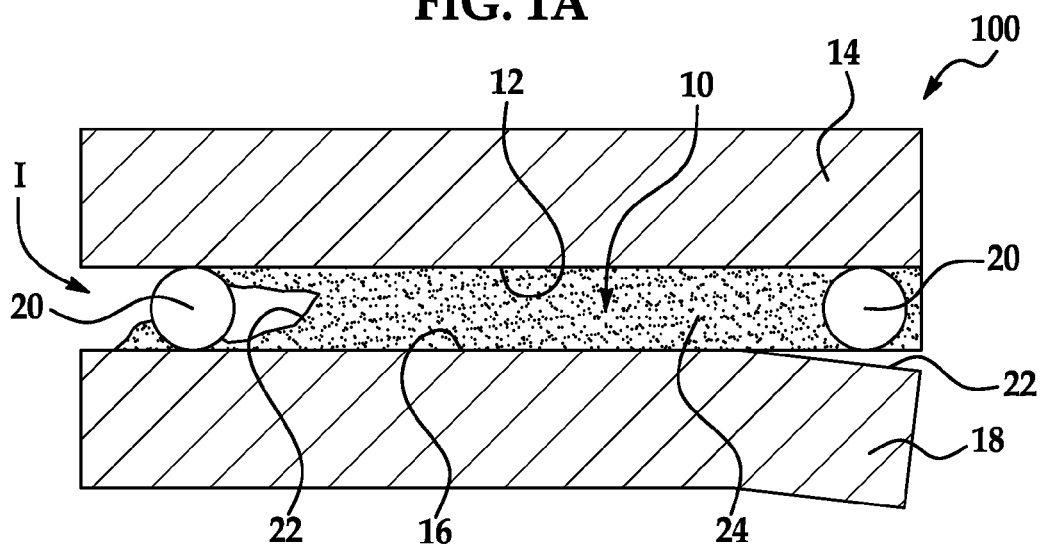
Figure 1C:
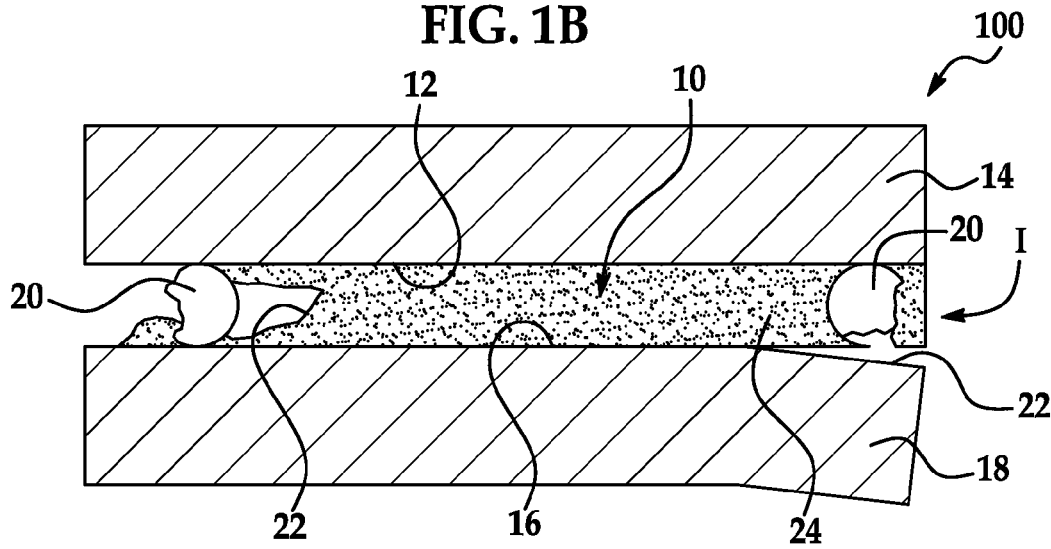

An embodiment of the method of controlling crevice corrosion is generally depicted in FIGS. 1A-1C. The method begins by forming a blend 10 of magnesium particles 20 and one of an adhesive or a sealant 24. The blend 10 is generally formed by mixing the magnesium particles 20 into the adhesive or sealant 24. It is to be understood that when the magnesium particles 20 and the adhesive or sealant 24 are blended, the magnesium particles 20 and the adhesive or sealant 24 do not react in a manner sufficient to hinder the adhesivity of the adhesive and/or the sealability of the sealant. As such, a mixture or blend of the adhesive or sealant 24 having the particles 20 therein is generated.

If an adhesive is used in the blend 10, the adhesive is selected from adhesives that will suitably bond the two or more metal components together (such as, e.g., the first metal component 14 and the second metal component 18 depicted in FIGS. 1A-1C). Non-limiting examples of such adhesives include epoxy-based adhesives, acrylic-based adhesives, or combinations thereof. Similarly, if a sealant is used in the blend 10, the sealant is selected from sealants that will suitably seal the interface I between the metal components 14, 18. A non-limiting example of such a sealant includes silicate-based sealants.

The magnesium particles 20 in the blend 10 are formed of magnesium-containing materials, and have a diameter that is sufficient to span a distance between the metal components 14, 18 when the components are joined together (as schematically shown in FIG. 1A). In other words, the diameter of each magnesium particle 20 is equal to or slightly less than the width W of the interface I between the joined metal components 14, 18. Generally, the size of these magnesium particles 20 is such that electrical contact may be made between each of the metal components 14, 18 and the particles 20.

As will be described in further detail below, at least partial dissolution of the magnesium particles 20 occurs when the joined components 14, 18 are exposed to corrosive environments. Without being bound by any theory, it is believed that the at least partial dissolution of the magnesium particles 20 generates enough electrons to cathodically protect the metal components 14, 18. It is also desirable that the lifetime of the magnesium particles 20 spans the lifetime of the joined components 14, 18. As such, the magnesium particles 20 are selected so that they have a substantially low self-corrosion rate. Generally, the self-corrosion rate should be as low as possible such that the dissolution of the particles 20 is capable of generating a maximum current to cathodically protect the metal components 14, 18. In a non-limiting example, the self-corrosion rate of the magnesium particles 20 is less than about 350 mg/cm$^2$/day. In another non-limiting example, the self-corrosion rate of the magnesium particles 20 is less than about 0.1 mg/cm$^2$/day.

Non-limiting examples of materials meeting the criteria stated above that are suitable for the magnesium particles 20 include substantially pure magnesium (i.e., magnesium having less than about 0.1% of impurities) or magnesium alloys. A non-limiting example of a suitable magnesium alloy is magnesium alloyed with aluminum, non-limiting examples of which include magnesium-aluminum alloys AZ31, AM30, AZ91, AM50. Further, the magnesium-aluminum alloy may have, in an embodiment, less than or equal to about 50 atm % of aluminum. Other examples of suitable magnesium alloys include, but are not limited to, magnesium alloyed with zirconium, manganese, zinc, rare earth elements, and/or the like, and/or combinations thereof. It is to be understood that magnesium alloys may be particularly desirable for parts 100 with galvanized steel components 14, 18. Lower purity magnesium tends to have a relatively high self-corrosion rate and thus may be less desirable or non-desirable for the blend 10.

The amount of magnesium particles 20 included in the blend 10 depends on one or more of the following factors. The amount of magnesium particles 20 used may be selected based upon, at least in part, the dissolution rate of such particles 20 when the joined components 14, 18 are exposed to a corrosive environment (described in further detail below in connection with FIG. 1C). The amount of magnesium particles 20 used may also be selected based upon, at least in part, the desirable bonding strength of the adhesive or sealant 24. It is to be understood that if the amount of particles 20 present in the blend 10 is too large, the bonding strength of the adhesive/sealant 24 may be deleteriously affected. Still further, the amount of magnesium particles 20 used may be selected based on a length of time for controlling the crevice corrosion at the interface I. Generally, these factors are balanced when determining how much of the magnesium particles 20 are incorporated into the blend 10.

Still with reference to FIG. 1A, the blend 10 (including the magnesium particles 20) is disposed at the interface I formed between a surface 12 of the metal component 14 and a surface 16 of the metal component 18. As such, the resulting part 100 includes the components 14, 18 having the blend 10 positioned in the interface I therebetween. Non-limiting examples of metals used for the metal components 14, 18 include steel, galvanized steel, aluminum alloys, magnesium alloys, copper alloys, tin alloys, or combinations thereof.

In an embodiment, the blend 10 is applied to one or both of the surfaces 12, 16 prior to joining the metal components 14, 18 together. In this embodiment, if the blend 10 includes the adhesive, the adhesive alone may be sufficient to bond the components 14, 18 together. In some instances, however, an additional mechanical or metallurgical joining process may be used to strengthen the bond between the components 14, 18. In another embodiment, for example, when the blend 10 includes the sealant, the components 14, 18 are joined via any suitable joining process (e.g., a mechanical or a metallurgical joining process), and then the blend 10 is applied to the interface I. For example, the sealant may be applied over interface I or may otherwise be applied at an angle to the interface I.

As indicated above, defects in the blend 10 and/or deformations in the metal material of the components 14, 18 at the interface I may occur as a result of i) the mechanical and/or metallurgical joining processes used, and/or ii) the natural degradation of the adhesive or sealant material 24 used in the blend 10. In some instances, the defects and/or deformations at the interface I may also or otherwise occur as a result of mechanical tearing or other pulling forces at the interface I, which may occur, e.g., during servicing of the joined parts. As shown in FIG. 1B, crevices 22 may form as a result of the defects and/or deformations. As non-limiting example, these crevices 22 may be formed from the degradation of the adhesive or sealant material 24 (as depicted on the left side of the interface I in FIG. 1B) and/or from delamination of the adhesive or sealant material 24 from the surfaces 12, 16 of the components 14, 18 (as depicted on the right side of the interface I in FIG. 1B).

During the useful life of the part 100, the components 14, 18 and the interface I (including the blend 10 therein) may be exposed to corrosive environments (not shown in FIGS. 1A through 1C). Upon exposure to such environments, the corrosive species (e.g., Cl$^-$ ions) migrate into the crevices 22 of the interface I, contact the exposed metal of the components 14, 18, and initiate the corrosion process. When this occurs, the amount of depolarization reagents (such as, e.g., oxide and hydrogen ions) is limited in the crevice 22 when compared to other areas located outside of the crevice 22. A galvanic cell is formed at the crevice 22 due (at least in part) to the difference in concentration of the depolarization reagents inside and outside of the crevice 22. The metal (of the components 14, 18) inside of the crevice 22 acts as an anode and the metal outside of the crevice 22 acts as a cathode. As such, corrosion of the metal inside the crevice 22 may be accelerated by the cathodic reactions occurring outside of the crevice 22. Furthermore, the galvanic current $I_G$ (shown in FIG. 3) may carry at least some of the corrosive species into the crevice 22. As a result, the dissolution of the exposed metal at the interface I may further be accelerated. When hydrolysis reactions that occur after dissolution of the metal reaches a certain level, acidification of the corrosive species occurs in the crevice 22 and corrosion of the metal material may also be further accelerated.

Figure 2:
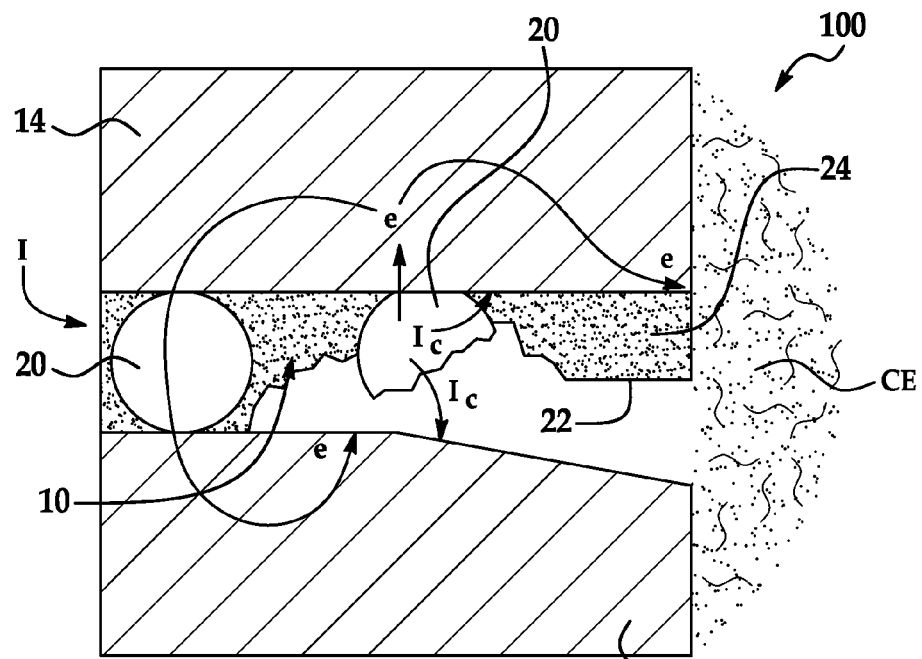
FIG. 2 is a schematic cross-sectional view depicting the formation of i) a negative potential at the surface of the metal components and ii) current from the magnesium particle.

With reference now to FIGS. 1C and 2, when the interface I is exposed to the corrosive environment CE, the corrosive species at least partially dissolves the magnesium particles 20 present in the blend 10. Without being bound by any theory, it is believed that the at least partial dissolution of the magnesium particles 20 substantially inhibits or even prevents corrosion of the metal of the components 14, 18 exposed at the crevices 22. More specifically, it is believed that the magnesium particle 20 in the crevice 22 act as a sacrificial anode offering cathodic protection to the metal exposed by the crevice 22. Electrons ("e" shown in FIG. 2) generated from the magnesium particle 20 upon at least partial dissolution thereof flow to the metal component 14, 18 (as shown in FIG. 2) and/or flow through the crevice 22 and contact the exposed metal 14, 18. These electrons e charge and polarize the metal 14, 18 to a negative potential in a manner sufficient to substantially prevent the metal 14, 18 from being electrochemically dissolved (i.e., corroded). Stated another way, the dissolution of the magnesium particles 20 generates a current IC (see FIG. 2) to cathodically protect the metal in the crevice 22 from corrosion.

Figure 3:
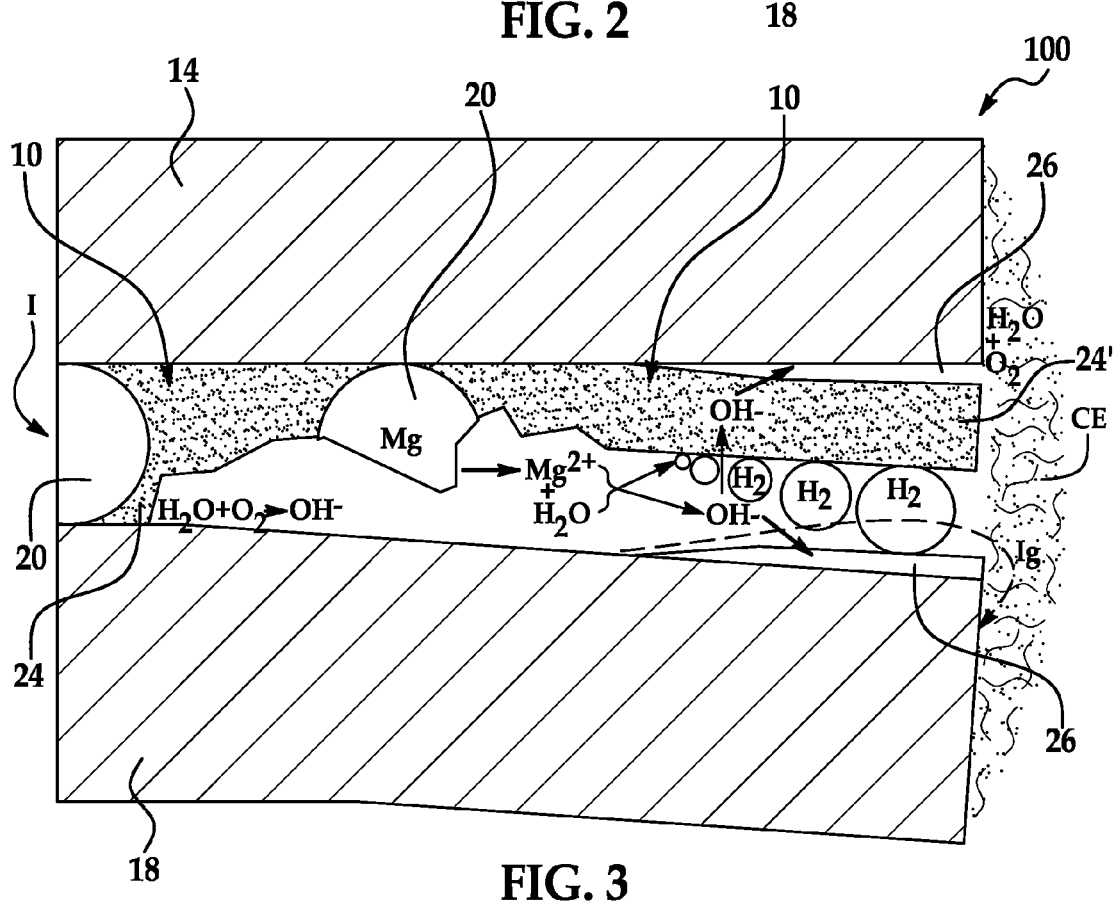
FIG. 3 is a schematic cross-sectional view depicting the formation of i) an alkalized solution and ii) hydrogen bubbles.

It is further believed that at least partial dissolution of the magnesium particles 20 alkalizes the corrosive species present at the interface I in order to delay any acidification reactions that may occur in the crevice 22. This is schematically depicted in FIG. 3. More specifically, when the magnesium particle 20 at least partially dissolves, magnesium ions ($Mg^{+2}$) hydrolyze in a solution containing the corrosive species inside the crevice 22 and generate hydrogen bubbles ($H_2$) and hydroxyls ($OH^-$). The hydroxyls $OH^-$ alkalize the corrosive species in the crevice 22 and prevent acidification of the corrosive species (which tends to occur when the metal of the components 14, 18 hydrolyzes in the crevice 22). As a result, the corrosion process is substantially inhibited and the alkalized corrosive species facilitates passivation of the metal in the crevice 22. Additionally, the alkalized species may penetrate through any degraded adhesive or sealant material 24' and protect the underlying metal of the components 14, 18. The passivation of the components 14, 18 results in the formation of a passive film 26, as shown in FIG. 3.

Additionally, the hydrogen bubbles $H_2$ generated upon at least partial dissolution of the magnesium particles 20 substantially block the crevice 22 to prevent the flow of any corrosive species in and/or through the crevice 22 with the galvanic current $I_G$. Blocking the crevice 22 with the hydrogen bubbles $H_2$ also eliminates galvanic effects that could potentially accelerate corrosion of the exposed metal in the crevice 22. Further, blocking the crevice 22 helps to sustain the alkalinity level in the crevice 22, which also substantially inhibits corrosion of the exposed metal components 14, 18 (as discussed hereinabove).

While FIG. 2 illustrates the mechanism of cathodic protection and FIG. 3 illustrates the mechanisms of alkalization of the corrosive species and formation of the hydrogen bubbles $H_2$, it is to be understood that such mechanisms occur simultaneously within the interface I after exposure of the part 100 to the corrosive environment CE. The mechanisms are illustrated separately herein in order to facilitate understanding and for clarity.

It is to be understood that during spot welding, the magnesium particles 20 in the adhesive/sealant 24 may be used as a conductive medium in the viscoelastic core during lamination. Other particles, such as copper particles, iron particles, iron-phosphide particles, stainless steel particles, aluminum particles and nickel particles, to name a few, may be suitable to act as a conductive medium. It is believed, however, that such other particles do not offer sufficient cathodic protection of the metal exposed by the crevices 22. In fact, these other particles tend to accelerate corrosion of the exposed metal in the crevice 22 when exposed to a corrosive environment. As such, the magnesium particles 20 may be particularly desirable in the embodiments disclosed herein, while it may also be desirable to exclude such other particles when using spot welding to join the components 14, 18.

For any of the embodiments disclosed above, it is to be understood that the mechanical process used to join the components 14, 18 together will generally not alter the chemical state of the magnesium particles 20 (for instance, the magnesium particles are not oxidized), and thus will not deleteriously affect crevice corrosion control. However, some metallurgical joining processes (e.g., welding) may burn off some of the adhesive in the blend 10 and at least partially oxidize the magnesium particles 20. In this instance, it is believed that the at least partially oxidized magnesium particles 20 will remain in the crevices 22; however, cathodic protection of the magnesium particles 20 may be reduced due to the loss of some electrical contact between the particles 20 and the components 14, 18. At least partially oxidizing the magnesium particles 20 does not affect alkalization, and as such, it is believed that the oxidized magnesium particles will significantly increase the pH of the species present in the crevices 22 and will compensate for the loss of cathodic protection of non-oxidized magnesium particles. Accordingly, crevice corrosion may also be controlled when the magnesium particles 20 are at least partially oxidized.

While several embodiments have been described in detail, it will be apparent to those skilled in the art that the disclosed embodiments may be modified. Therefore, the foregoing description is to be considered exemplary rather than limiting.

The invention claimed is:

1. A method of controlling corrosion at an interface formed between at least two metal components, the method comprising:
   applying a blend of magnesium particles and one of an adhesive or a sealant to the interface, each of the magnesium particles having a diameter sufficient to span a distance extending from one of the at least two components at the interface to an other of the at least two components at the interface; and
   exposing the at least two components to a substantially corrosive environment, the substantially corrosive environment including a corrosive species that at least partially dissolves the magnesium particles at the interface to:
   i) cathodically protect the at least two components at the interface;
   ii) alkalize the corrosive species at the interface, the alkalizing including:
       hydrolyzing magnesium ions produced from the at least partial dissolution of the magnesium particles; and
       generating hydroxyl ions from the hydrolyzing, the hydroxyl ions to react with and alkalize the corrosive species; and
   iii) generate hydrogen bubbles that substantially block a crevice formed at the interface.

2. The method as defined in claim 1 wherein the diameter of each of the magnesium particles is further sufficient to enable electrical contact between the at least two components and the magnesium particles.

3. The method as defined in claim 1 wherein the at least partially dissolved magnesium particles cathodically protect the at least two metal components at the interface by generating electrons from the at least partially dissolved magnesium particles, the electrons charging and polarizing the at least two metal components at the interface in a manner sufficient to substantially prevent dissolution of the at least two metal components at the interface.

4. The method as defined in claim 1 wherein the hydrogen bubbles i) substantially prevent current generated during at least partial dissolution of the magnesium particles from flowing between an inside and an outside of the crevice, and ii) substantially halt an exchange of the corrosive species present in the corrosive environment between the inside and the outside of the crevice, thereby sustaining a predetermined alkalinity level in the crevice.

5. The method as defined in claim 1, further comprising selecting an amount of magnesium particles for the blend based upon a dissolution rate of the magnesium particles in the crevice and a length of time for controlling the crevice corrosion at the interface.

6. The method as defined in claim 1, further comprising selecting the magnesium particles from one of particles of pure magnesium or particles of a magnesium alloy.

7. The method as defined in claim 1 wherein the magnesium alloy is magnesium alloyed with aluminum, zirconium, zinc, manganese, rare earth elements, or combinations thereof.

8. The method as defined in claim 1 wherein the magnesium particles have a self-corrosion rate of less than 350 mg/cm2/day.

9. The method as defined in claim 1 wherein the at least two metal components are selected from steel, galvanized steel, aluminum alloys, magnesium alloys, copper alloys, tin alloys, and combinations thereof.

10. The method as defined in claim 1, further comprising blending the magnesium particles with the adhesive or the sealant to form the blend, wherein the magnesium particles and the adhesive or the sealant does not react in a manner sufficient to hinder an adhesivity of the adhesive, a sealability of the sealant, or a combination thereof.

11. The method as defined in claim 1 wherein the blend does not include copper, iron, iron phosphides, stainless steel, aluminum or nickel particles.

12. The method as defined in claim 1 wherein the magnesium particles are at least partially oxidized.

13. The method as defined in claim 1 wherein the magnesium particles are not oxidized.

14. The method as defined in claim 1 wherein the diameter of each magnesium particle is equal to the distance.

15. The method as defined in claim 1 wherein the alkalizing of the corrosive species at the interface produces an alkalized corrosive species, and wherein the alkalized corrosive species penetrates through the one of the adhesive or the sealant to passivate the at least two metal components.

16. The method as defined in claim 15, further comprising forming a passive film on the at least two metal components when the at least two metal components passivate.

\* \* \* \* \*